Patented Sept. 22, 1953

2,653,092

UNITED STATES PATENT OFFICE 2,653,092

PROCESS OF PURIFYING ALCOHOLIC LIQUOR

John B. Renier, South Bend, Ind.

No Drawing. Application April 4, 1951,
Serial No. 219,328

1 Claim. (Cl. 99—48)

This invention relates to a process of purifying alcoholic liquor.

The primary object of the invention is to provide a novel, simple and inexpensive method by which whisky and other alcoholic liquors may be purified to remove the toxic and unpalatable constitutents therefrom in a rapid and expeditious manner.

A further object is to provide a novel process by means of which a rapid "aging" action upon raw or newly distilled whisky can be performed to remove fusel oil and acetic acid.

The usual process, by means of which newly distilled or raw whisky or alcoholic liquor is prepared for consumption as an alcoholic beverage, is to place the same within a sealed wooden barrel or cask, usually of white oak or red oak, and to permit the barrel so filled to stand for a period of time several years or more in extent. This process is known as "aging" whisky, and the quality of the whisky depends upon and is proportional to the period of time in which the whisky or spirits are permitted to stand in this barrel or container. A certain minimum "aging" is required to render the spirits suitable for human consumption as an alcoholic beverage. "Aging" beyond this minimum progressively improves the quality of the whisky with respect to its palatability as principally determined by the concentration therein of acetic acid or other constituents having a bitter or biting taste to the tongue.

I have found that separation of fusel oil and acetic acid from raw whisky or other alcoholic liquors, such as potato whisky, corn whisky, rye whisky, or any alcoholic liquor obtained by the distillation of the mash of fermented cereal grain, or from the malt with unmalted cereals, can be accomplished very inexpensively, expeditiously and quickly in the following manner.

The raw whisky or spirits of any proof, for example a whisky from 60 proof to approximately 190 proof, is placed in a wooden container. This container may be the usual type of container used for aging whisky, such as a barrel made of white oak or red oak. The barrel is then closed and sealed.

The wooden barrel containing the raw spirits is then placed in a tank containing water of a depth sufficient to permit the barrel to float freely therein. The tank will preferably be of a size greater than the size of the barrel so that the barrel fits freely therein and the water encircles the tank. In other words, the barrel is preferably positioned out of contact with the tank wall.

The water in the tank is then heated while the spirit-containing wooden barrel floats freely therein. The temperature to which the water is heated will preferably be a temperature in the range from 100° F. to 212° F. The application of heat is continued for the period of time which is required for the purifying or "aging" operation and depends upon the temperature. The temperature need not be uniform at all times nor need the heating be continuous.

I have found that the fastest results are secured by heating the water to a boiling temperature of 212° and holding it at the boiling point. It will be understood that this operation requires continual replenishment of water to the tank as the heating operation proceeds. The time which is required to treat the liquor or spirits to separate the undesired constituents therefrom is usually approximately twenty-four hours. It will be understood, of course, that the time the treatment proceeds will depend wholly upon the result of tests of known type made upon the liquor to ascertain its purity, and particularly to ascertain the presence or extent of fusel oil, acetic acid and other undesired constituents contained within the spirits.

The time required to secure effective and desired results, that is, purification of the spirits to render them non-toxic and palatable, increases as the temperature at which the water is heated is reduced. Thus I have found that when the water is heated to 140° F., the time required for the "aging" action of the whisky to occur, will be from 36 to 40 hours.

While I prefer to permit the spirit-containing barrel to float freely in the tank of water, it may not be desirable in all instances to permit such free floating action. Thus in some instances it may be desirable to hold the spirit-containing barrel within the body of water in a submerged position riding lower in the water than this free floating position and thus insuring the complete immersion of the barrel or container. Care should be taken in such cases, however, to hold the container at a level spaced above the bottom of the tank so that a layer of water will intervene between the bottom of the tank and the bottom of the barrel.

Having described one illustrative procedure embodying my invention, what I claim as my invention is:

The method of treating raw whisky to reduce the fusel oil and acetic content thereof to an extent to render the whisky non-toxic and palatable, consisting of the steps of immersing a closed wooden container containing said raw whisky in a body of water in a free floating relation in said body of water, and heating said water to boiling temperature and maintaining said boiling temperature for at least 36 hours.

JOHN B. RENIER.

References Cited in the file of this patent

UNITED STATES PATENTS

| Number | Name | Date |
|---|---|---|
| 196,094 | Johnson | Oct. 16, 1877 |

OTHER REFERENCES

Industrial and Engineering Chemistry, News edition, vol. 12, No. 7, "Artificial Aging of Spirits," pages 120 and 121.

Chemistry and Technology of Wines and Liquors by Ki M. Herstein and Morris B. Jacobs, second edition, published 1948 by D Van Nostrand, New York city, pages 142–146.